(12) United States Patent
Godfrey

(10) Patent No.: US 6,889,279 B2
(45) Date of Patent: May 3, 2005

(54) PRE-STORED VECTOR INTERRUPT HANDLING SYSTEM AND METHOD

(75) Inventor: Kevin P. Godfrey, West Lothian (GB)

(73) Assignee: Cadence Design Systems, Inc., San Jose, CA (US)

(*) Notice: Subject to any disclaimer, the term of this patent is extended or adjusted under 35 U.S.C. 154(b) by 511 days.

(21) Appl. No.: 09/735,266

(22) Filed: Dec. 11, 2000

(65) Prior Publication Data

US 2002/0073262 A1 Jun. 13, 2002

(51) Int. Cl.$^7$ ................................................ G06F 13/32
(52) U.S. Cl. ........................ 710/269; 710/260; 710/268
(58) Field of Search ................................. 710/260–269

(56) References Cited

U.S. PATENT DOCUMENTS

| | | | |
|---|---|---|---|
| 5,511,200 A | | 4/1996 | Jayakumar |
| 5,557,764 A | * | 9/1996 | Stewart et al. .............. 710/269 |
| 5,608,886 A | * | 3/1997 | Blomgren et al. .......... 712/239 |
| 5,659,760 A | * | 8/1997 | Enami ......................... 710/269 |
| 5,734,911 A | * | 3/1998 | Lai .............................. 710/269 |
| 6,000,025 A | * | 12/1999 | Caudel et al. ................ 712/32 |
| 6,067,407 A | * | 5/2000 | Wadsworth et al. ........ 709/224 |
| 6,154,837 A | * | 11/2000 | Fudeyasu et al. ............. 713/2 |
| 6,205,509 B1 | * | 3/2001 | Platko et al. ............... 710/269 |
| 6,324,608 B1 | * | 11/2001 | Papa et al. .................. 710/104 |
| 2002/0016880 A1 | * | 2/2002 | Bhagat ........................ 710/261 |
| 2002/0019902 A1 | * | 2/2002 | Christie ...................... 710/260 |
| 2002/0052993 A1 | * | 5/2002 | Dowling ..................... 710/260 |
| 2003/0101301 A1 | * | 5/2003 | Taniguchi ................... 710/260 |

OTHER PUBLICATIONS

Interrupt controller description from Atmel AT91 ARM Thumb Microcontrollers AT91M40400, 10/99, pp. 34–49.
Ball, Richard, "SystemsSpotlight M. Core: What the future holds," Electronics Weekly, Dec. 9, 1998.

* cited by examiner

Primary Examiner—Mark H. Rinehart
Assistant Examiner—Kim T. Huynh
(74) Attorney, Agent, or Firm—Bingham McCutchen LLP (57) ABSTRACT

A pre-stored vector interrupt handling system for rapidly processing interrupt requests from input/output (I/O) devices in processor-based systems includes selection logic and an interrupt vector store to quickly deliver a branch instruction from the interrupt vector store directly to the execution unit of a processor. The interrupt vector store is either pre-loaded with a table of the processor's branch instructions during system initialization or implemented in ROM. During normal operation, when an interrupt is received, a master interrupt signal is issued to the processor, which asserts an instruction cycle mode signal to external chip select logic. The chip select logic deselects the program store and selects the interrupt vector store. An interrupt vector from the vector store is loaded onto the data bus and then directly into the execution unit of the processor.

35 Claims, 5 Drawing Sheets

PRE-STORED VECTOR INTERRUPT HANDLING SYSTEM AND METHOD

FIELD OF THE INVENTION

The field of the present invention relates generally to processor-based systems, and, more particularly, to methods and systems for vectored interrupt handling in processor-based systems.

BACKGROUND

Processor-based systems use peripheral components, also called input and output (I/O) devices, to communicate with the external environment. Perhaps the most familiar processor-based system is the digital computer. Examples of I/O devices found in computer systems include the keyboard, monitor, disk drive, modem, and network interface card, to name a few. An I/O device requiring attention usually sends an I/O service request of some sort to the processor.

In most applications, the speed and efficiency with which a system processes I/O requests is one of the chief determinants of the system's overall throughput. Thus, an ordinary single processor system generally must have some method for allocating the processor's time among each of the system's I/O devices as each one periodically requests attention from the processor. The predominant methods for servicing these requests are polling and interrupt control.

Figure 1:
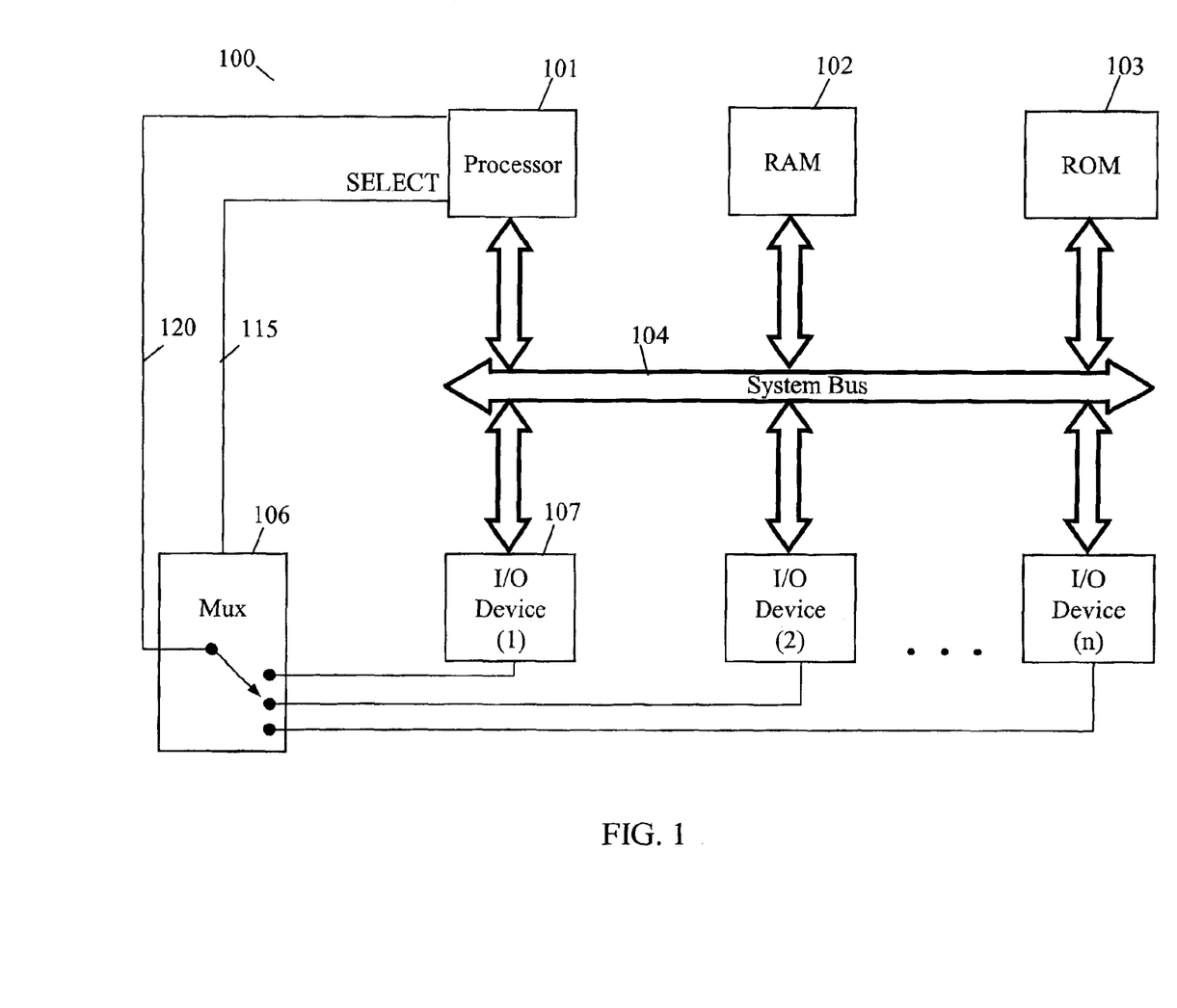
FIG. 1 is a block diagram illustrating a processor-based system using a polling method of processing interrupts.

FIG. 1 is a block diagram functionally representing a processor-based system 100 using a polling method. Processor 101, RAM module 102, and ROM module 103, and possibly other system components not shown in the diagram, are each connected to a system bus 104. A plurality of I/O devices 107 are also connected to the system bus 104. Each I/O device 107 is also connected to the inputs of a processor-controlled multiplexer 106, which is selectively controlled by the processor 101 by a select signal 115. In a typical application of the polling method, the multiplexer 106 is responsible for querying (i.e., polling) each I/O device 107, in turn, to determine whether the I/O device 107 needs the attention of the processor 101. If the I/O device being polled requires the attention of the processor 101, as indicated by the state of multiplexer output signal 120, the processor 101 responds by suspending its current operation and devoting its time to servicing the I/O device 107 in need. If the I/O device 107 being polled is not currently in need of service, the multiplexer 106 will poll the next I/O device 107 in sequence until all the I/O devices 107 have been queried. The processor 101 loops continuously through the polling cycle, temporarily suspending program execution whenever the polling cycle encounters an I/O device 107 in need of service.

Figure 2:
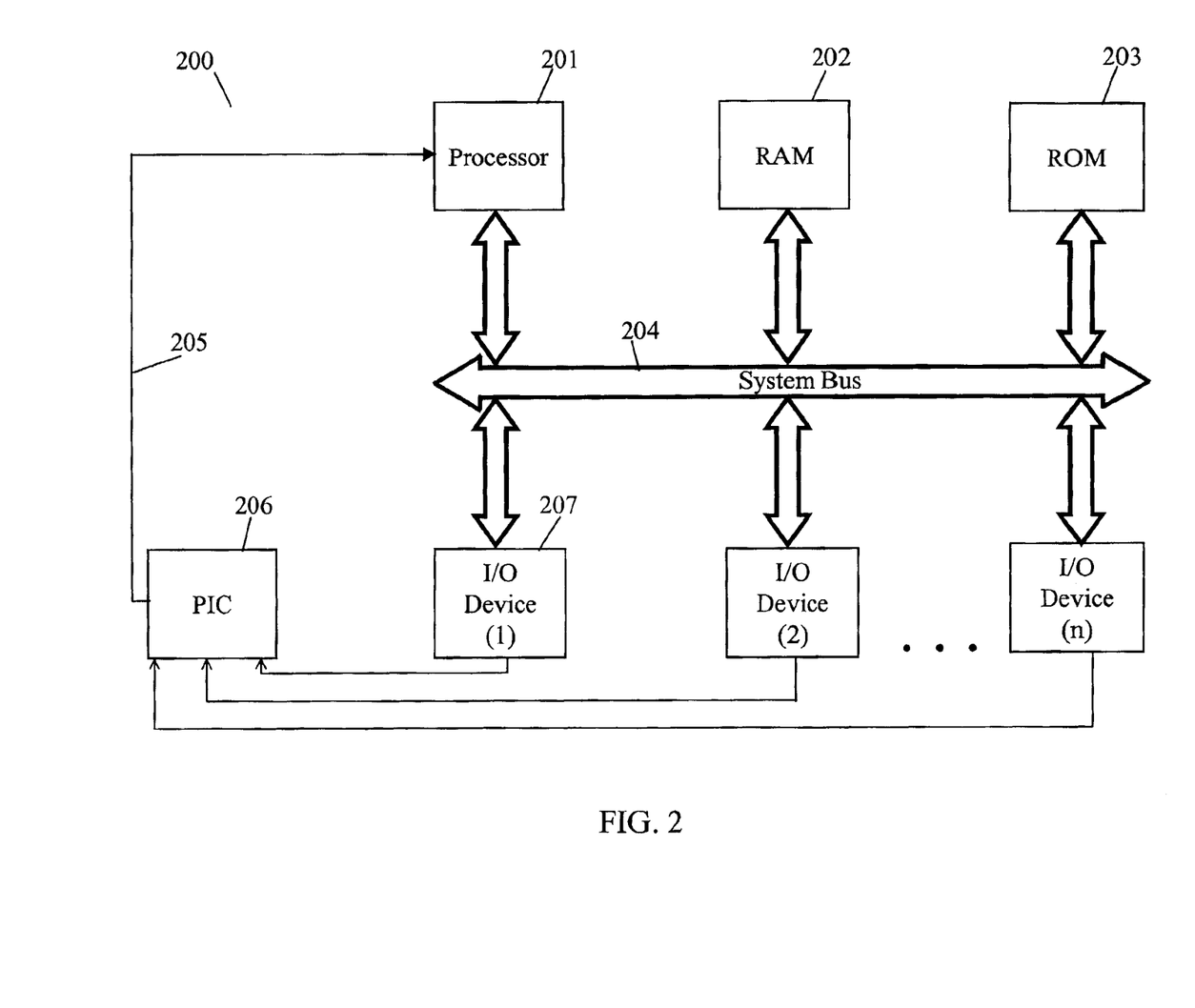
FIG. 2 is a block diagram illustrating a processor-based system using an interrupt method of processing interrupts.

FIG. 2 is a block diagram functionally representing an interrupt control method of processing I/O service requests. Processor 201, RAM module 202, and ROM module 203, and possibly other system components not shown in the diagram, are each connected to a system bus 204. A plurality of I/O devices 207 are also connected to the system bus 204. The interrupt control method in certain applications generally facilitates service requests by aggregating interrupt request ("IRQ") lines in a control block conventionally known as a programmable interrupt controller (PIC) 206. The PIC 206 is responsible for overall management of the interrupt process. As a practical matter, I/O devices 207 almost never assert interrupt signals directly to the processor 201. Instead, the PIC 206 centralizes control and determines whether the current interrupt request is of greater importance than the current processor task. This determination is called prioritization and is usually performed by a prioritizer within the PIC.

Prioritization is a means of hierarchically arranging the order of interrupt handling by the processor when more than one I/O device requests service either simultaneously or sequentially. Systems establish priority through either hardware or software. Some computer systems establish hardware priority by the physical placement of I/O device interfaces along the backplane. Thus, a device's physical placement on the backplane corresponds to its level in the hierarchy. For instance, I/O devices of higher priority sit physically closer to the processor while I/O devices of lower priority are placed near the end of the device chain, further out on the backplane.

In addition to prioritization, the PIC masks the issuance of interrupt signals to the processor. Masking is utilized to dynamically control which interrupts are serviceable. For those applications where interruption would be undesirable, service requests may be temporarily disabled. However, some interrupts are non-maskable, such as power failure. In some systems, a service request that is issued while interrupts are disabled may be saved for processing after interrupts become re-enabled.

Turning once again to the example of a conventional system as shown in FIG. 2, after masking and establishing priority, the PIC 206 asserts an interrupt signal to the processor's IRQ input. The processor 201 responds to the request by performing an interrupt service routine (ISR), sometimes called an interrupt handler program, which has been pre-loaded in memory 202, 203. The processor "fulfills" an interrupt request by completing the ISR associated with the particular I/O device 207.

A common implementation of the interrupt control method involves a "vectored" interrupt, which allows the processor to know which device issued the interrupt request. In this context, the vector is an address, or pointer, to the corresponding ISR. When the processor receives an IRQ from the PIC, the processor searches memory for the vector that corresponds to the branch instruction associated with the ISR for the particular device.

With both polling and interrupt control techniques, the processor must 7 temporarily suspend execution of the current program in order to execute the ISR. The processor first completes the current program instruction, then saves the current state of the register bank, including the program counter (PC), to a stack location in memory known as the process control block. At the completion of the ISR, the register and PC values are restored from the process control block and program execution continues with the instruction located at the memory address originally held by the PC prior to the interrupt. In this way, the processor is able to satisfy the aforementioned need for allocating its time among several I/O devices.

Both polling and interrupt control techniques employ the processor to seek out the interrupt source. Each method is inefficient and wasteful in its own regard. The polling method wastes processor time looping through the polling cycle to the potentially serious detriment of system throughput. The interrupt control method typically uses an inefficient software search process for identifying the interrupt source that often involves reading interrupt data (e.g. flags or data registers) from the PIC and parsing the data provided. In both methods, the overhead of parsing the data provided by the PIC increases as more interrupt sources are added to a system. Once the source is determined, the processor finally branches to the ISR and the ISR is executed.

The software search routine employed by the interrupt control method introduces unnecessary delay between the assertion of an interrupt and the start of the execution of the appropriate ISR. This delay can become particularly pronounced in systems that have dozens or hundreds of interrupts. For some real-time systems, notably the digital signal processors found in wireless telephones, this latency represents a substantial burden to efficient signal processing. It would therefore be advantageous to provide a faster, more efficient technique for servicing multiple I/O devices or other components requiring service in a processor-based system.

SUMMARY OF THE INVENTION

The invention is directed in one respect, to a system and method for handling interrupts in processor-based systems. In a preferred embodiment, processor branch instructions are stored as vectors in a vector store, with each of the vectors corresponding to an interrupt service routine in memory. When an event occurs, the pre-stored vector interrupt handling system loads the execution unit with a vector from the vector store, rather than an instruction from memory, whenever the processor undergoes an instruction fetch cycle in response to an IRQ input. The processor then immediately effectively branches to the location specified by the vector and performs the corresponding interrupt service routine.

Direct vector delivery affords the system reduced interrupt-processing latency by avoiding software intensive search routines. In processor-based systems involving large numbers of interrupts, the overhead savings realized by the pre-stored vector interrupt handling system can be substantial. In the context of this invention, an interrupt vector comprises a complete branch instruction, which includes the branch op-code and the target address.

DETAILED DESCRIPTION OF PREFERRED EMBODIMENTS

Figure 3:
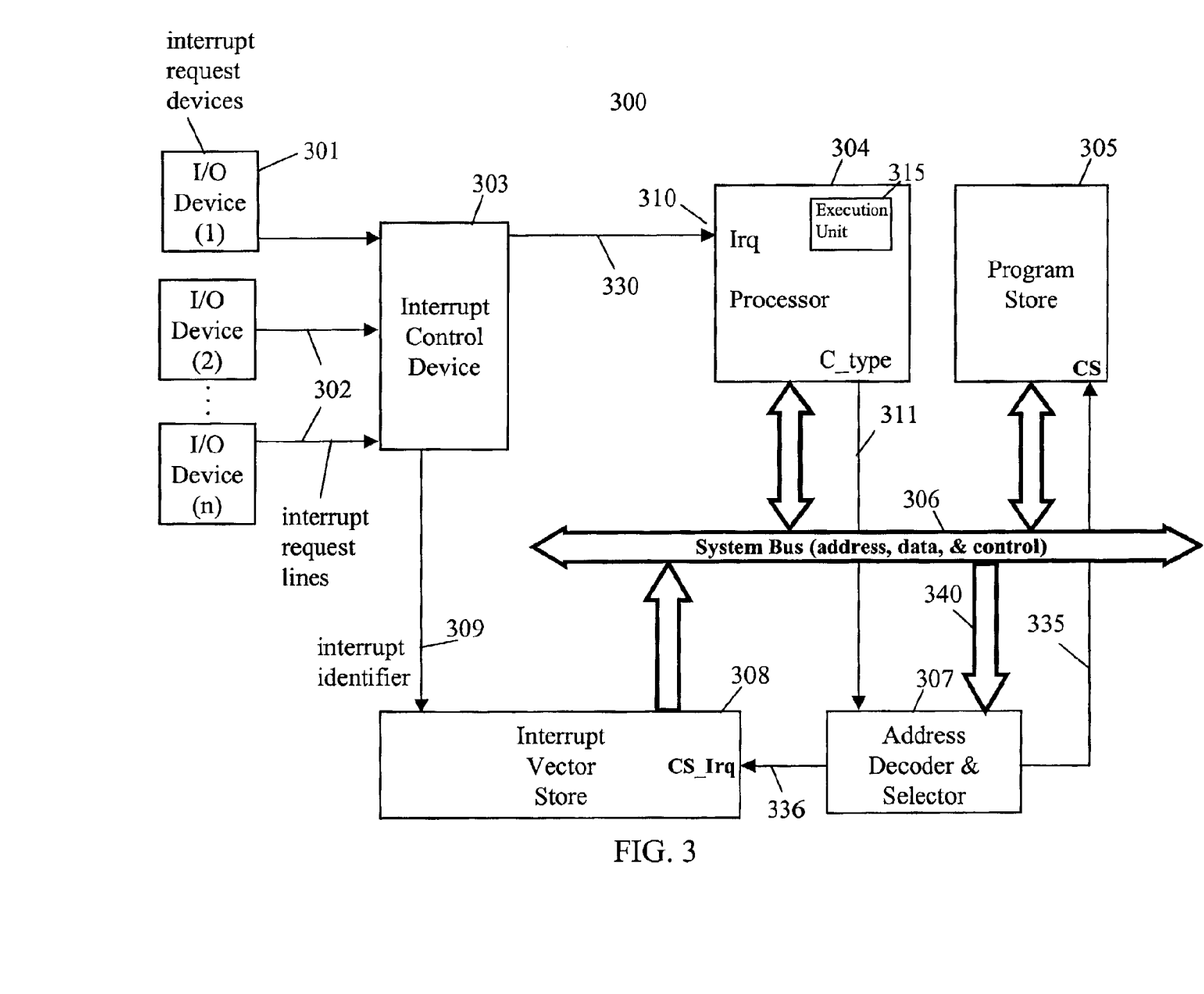
FIG. 3 is a block diagram of a pre-stored vector interrupt handling system using a selector in accordance with one embodiment as disclosed herein.

FIG. 3 is a block diagram of one embodiment of a pre-stored vector interrupt handling system. As shown in FIG. 3, a plurality of I/O devices 301 are connected to an interrupt control device 303 via a plurality of interrupt request lines 302. The interrupt control device 303 outputs a master interrupt request signal 330 connected to the interrupt request (IRQ) input 310 of a processor 304. The processor 304, along with a program store 305 and interrupt vector store 308 (and potentially other components not illustrated in FIG. 3), are connected to a system bus 306. A control signal 311 is output from the processor 304 to an address decoder and selector 307, which is connected to the program store 305 via a chip select (CS) control signal 335 and the interrupt vector store 308 via a CS_Irq control signal 336. The address decoder and selector 307 is also coupled to the system bus 306 by signal path 340. The interrupt control device 303 is also connected to the interrupt vector store 308, via an interrupt identification signal 309.

In operation, when service is requested by one of the I/O devices 301, the interrupt control device responds by (1) issuing an interrupt identifier 309 to the interrupt vector store 308, and (2) asserting a master interrupt request signal 330 to the IRQ input 310 of the processor 304. In response to the master IRQ signal 330, the processor 304 issues a control signal (also referred to herein as a C_type, or cycle type signal) 311, that corresponds to a specific bus cycle type. Specific implementations of cycle type signaling are processor dependent. For example, in one embodiment, the cycle type signals are codes which are interpreted to correspond to the various cycle type operations (i.e., data write, data read, instruction fetch, etc.) supported by the particular processor. The address decoder and selector 307 is responsible for intercepting the processor's cycle type signal. When (1) the cycle type signal that the address decoder and selector 307 intercepts is qualified by the address decoder and selector 307 to be an instruction fetch operation, and (2) the address on the address bus resolves to a valid memory mapped location in the program store associated with the interrupt vector store, the address decoder and selector 307 asserts a control signal 336 to the interrupt vector store 308. The address decoder and selector 307 (which could in some instances be embodied as simply as a flip-flop having inverting and non-inverting outputs) does this by de-asserting the chip select signal 335 for the program store 305 and instead asserting the interrupt request chip select (CS_Irq) signal 336 to the interrupt vector store 308. The CS_Irq signal 336 and the chip select signal 335 are mutually exclusive. The interrupt vector store 308 then delivers a pre-stored vector (in the form of a branch instruction op-code and address) directly to the processor's execution unit 315. The processor immediately executes the branch instruction and inserts the address into the program counter, rather than allowing the processor 304 to fetch the branch instruction from the program store 305, as is conventionally done. The processor 304, program store 305, address decoder and selector 307, and interrupt vector store 308 blocks in the diagram, by virtue of being connected together by a system bus 306, are permitted to perform addressing and data transfer between them. However, the address decoder and selector 307 is given read-only access to the address portion of the system bus 306, while the interrupt vector store 308 is allowed only write access to the data portion of the bus 306.

The execution unit of the processor often includes an instruction fetcher, an instruction decoder, an arithmetic/logic unit (ALU), a program counter, and potentially other components depending upon the complexity of the processor. In one embodiment of the pre-stored vector interrupt handling system, the branch instruction op-code and address are delivered to the processor's execution unit 315 by the interrupt vector store 308. Under this embodiment the execution unit is responsible for decoding the branch instruction op-code and delivering the branch instruction address to the execution units program counter. The next instruction is then fetched from the branch address location. However, another embodiment of the pre-stored interrupt vector handling system contemplates delivery of the address component of the branch instruction to the program counter of the execution unit 315 directly from the interrupt vector store 308, bypassing the execution unit's instruction fetch and decode logic. This embodiment is advantageous because instruction execution delay is minimized, but implementation of this embodiment would require programmer access to the internal workings of the processor. Thus, the embodiment one chooses to implement for a specific application of the pre-stored vector interrupt handling system is processor-dependent.

The pre-stored vector interrupt handling system 300 may also include a mechanism for masking the interrupt request lines 302. Masking is used to temporarily disable one or more interrupt request lines 302 when an application under processor control would be negatively affected if the application were interrupted. Including an interrupt mask register (not shown) within the interrupt control device 303 represents one way to enable interrupt masking. In such a case, the interrupt control device 303 would be connected to the system bus 306, enabling the processor 304 to adjust the contents of the interrupt mask register.

Another embodiment of a pre-stored vector interrupt handling system incorporating one or more concepts of the system of FIG. 3 includes a prioritizer within the interrupt control element. With a prioritizer, a plurality of interrupt request signals entering the interrupt control device can be prioritized prior to processing. Additionally, the prioritizer may be configured to assert an interrupt identifier signal to the interrupt vector store for identifying which interrupt vector to drive out when the pre-stored vector interrupt handling system intercepts the processor's normal instruction fetch cycle type signal. Prioritization can be particularly useful in two situations: (1) when more than one I/O device requests service at the same time, or (2) when an I/O device issues a more urgent (higher priority) request than the urgency of the interrupt request of lower priority currently being processed. In the second situation, the interrupt request of lower priority is said to be nested within the interrupt request of higher priority. The handling of nested interrupts is processor dependent. Thus, while a prioritizer may have no trouble issuing multiple concurrent (i.e., nested) interrupts of varying priority, each processor is designed or configured to receive and handle these nested interrupts in different ways. Alternatively, some processors may disallow nested or prioritized interrupt handling altogether by masking out subsequent interrupt request signals from the prioritizer once processing of an earlier interrupt request has begun.

The pre-stored vector interrupt handling system is processor independent. Yet, many microprocessors contain elements, such as cache RAM, which may require a change in the pre-stored vector interrupt handling system's operations. The pre-stored vector interrupt handling circuitry should be positioned so that interrupt vectors do not get stored in the instruction cache. For example, if the processor 304 of FIG. 3 contains a cache element, the contents of the cache may need to be saved by the processor 304 in addition to saving the register bank and program counter. Additionally, the processor 304 may use pipelining techniques to pre-fetch instructions from the program store 305. When pipelining or burst fill techniques are used by a processor, the interrupt vector store should hold sufficient instructions to meet the processor's specific requirements. In both cases, the pre-stored vector interrupt handling system relies on the processor to manage caching and instruction pre-fetch capabilities, potentially requiring a slight modification to FIG. 3.

Figure 4:
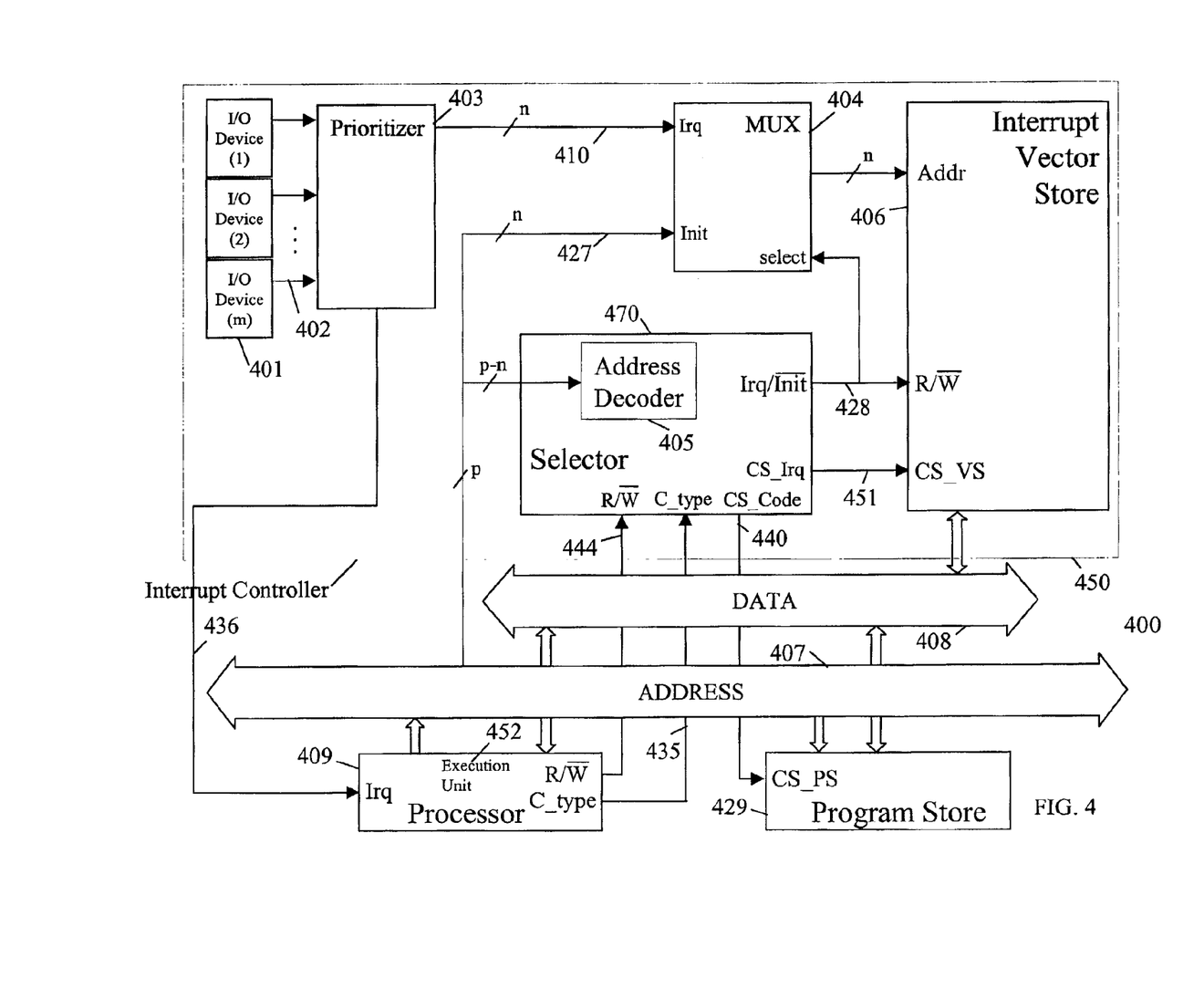
FIG. 4 is a block diagram of a multi-channel pre-stored vector interrupt handling system using a prioritizer in accordance with another embodiment as disclosed herein.

FIG. 4 is a block diagram of a multi-channel pre-stored vector interrupt handling system 400 using a prioritizer 403 as part of an interrupt controller 450. In FIG. 4, separate data bus 408 and address bus 407 portions of the system bus are depicted. A processor 409 and program store 429 are connected to both the data bus 408 and the address bus 407. An interrupt vector store 406 is connected to the data bus 408. An address decoder 406, which is part of a selector 470, is connected to the address bus, for accepting the high order (p-n) bits from the address bus for use in resolving the contents of the address bus with the memory mapped location associated with the interrupt vector store 406. The address bus 407 is further connected to a multiplexer 404 via bus channel 427. The multiplexer 404 assists in switching the system 400 between normal interrupt handling operation (interrupt mode) and vector store initialization (initialization mode), as further described below. A selector 470 is connected to the interrupt vector store 406 and issues a mode control signal 428 to the read/write (RAN) input of the interrupt vector store 406. The selector is further connected to the CS_VS input of the interrupt vector store 406 by a control signal 451 and to the CS_PS input of the program store 429 by a control signal 440. A plurality of up to $2^n$ I/O devices 401 are connected to the prioritizer 403 via a plurality of up to $2^n$ interrupt request lines 402. The prioritizer 403 outputs a multi-bit prioritized interrupt source identifier signal 410 of n bits unambiguously identifying the interrupt source to the multiplexer 404. The relationship between the number of serviceable I/O devices 401 and the corresponding preferred bit width of the interrupt source identifier signal 410 is given by $n=\log_2 m$, where m represents the maximum number of serviceable I/O devices, and n represents the size of the interrupt source identifier signal 410 in bits, rounded upwards. For example, for up to 32 I/O devices 401, n would be 5; for up to 16 I/O devices 401, n would equal 4.

The selector's address decode block 405 preferably exists independently of any other address decoder functionality which may be present in the system 400 or external thereto. Modified chip select logic external to the pre-stored vector interrupt handling system is also preferably provided to signal when the system operates in initialization mode. For example, a set of registers within the processor 409, which defines the processor's current state, may supply a control signal to the selector 470 for this purpose. This may be simply a status register or flag which the pre-stored vector interrupt handling system 400 can rely on to provide notification of the start of initialization. Similar external logic is responsible for ensuring that no other devices are selected for the data bus 408 at the same time the interrupt vector is being loaded thereon.

During vector store initialization (initialization mode), the CS_VS input to the interrupt vector store 406 is activated by control signal 451 to give the interrupt vector store exclusive control of the data bus. The selector must also ensure during initialization that the CS_Code control signal to the CS_PS input of the program store 429 is deselected. As part of initialization mode operation, the address decoder and selector 470 also (1) issues control signal 428 to the interrupt vector store 406 placing the interrupt vector store 406 in a write (W) mode, and (2) issues mode control signal 428 to the multiplexer 404 forcing the multiplexer 404 into an initialization mode. Upon successfully resolving the address bus high bits (p-n) to the memory mapped location of the interrupt vector store, the multiplexer 404 will transparently pass the address bus 407 low bits (n) to the interrupt vector store 406 via bus channel 427.

While in initialization mode, the address bus 407 receives the memory address corresponding to a specific interrupt vector (in the form of a branch instruction address) for a particular interrupt service routine. Also while in initialization mode, the data bus 408 receives the specific interrupt vector (i.e., branch instruction op-code and address) waiting to be written to the interrupt vector store 406. The system 400 cycles through all of the interrupt vectors and their allocated addresses to load the interrupt vector store 408. Loading can be carried out under the control of the processor 409 or another controller (e.g., a DMA controller). Initialization is complete when the interrupt vector store 408 holds a copy of every interrupt service routine branch instruction.

The inclusion of a multiplexer 404 as a component of the pre-stored vector interrupt handling system is necessary only insofar as no other method of interrupt vector store 406 initialization exists. One embodiment of the pre-stored vector interrupt handling system contemplates the implementation of the interrupt vector store 406 in ROM (not shown in FIG. 3 or FIG. 4). In this case, no multiplexer 404 would be required. Certain of the chip select logic and address decoding functionality would have to be modified accordingly to accommodate the absence of a multiplexer.

When the pre-stored vector interrupt handling system 400 finishes initializing the interrupt vector store 406, the system 400 switches to an operational mode (interrupt mode). While in interrupt mode, the selector 470 (1) issues a mode control signal 428 to the multiplexer 404, forcing the multiplexer 404 into interrupt mode (so that it will henceforth pass through the interrupt source identifier 410 from the prioritizer 403 rather than the address bus 407), and (2) issues the mode control signal 428 to the interrupt vector store 406, forcing the interrupt vector store 406 into a read (R) mode. During interrupt mode, information is normally only read from, not written into, the interrupt vector store 406, unless for some reason the interrupt vectors are modified during running of the program.

In both initialization and interrupt modes, the selector 470 is responsible (as between the interrupt vector store 406 and the program store 429 devices only) for ensuring exclusive access to the data bus 408 by one or the other of the two devices. In one embodiment, the selector uses simple digital logic using AND, OR, or NOT gates to deliver the CS_PS and CS_VS signals to the interrupt vector store 406 or the program store 429. Thus, when the CS_VS input to the interrupt vector store is asserted via control signal 451, the selector ensures that the CS_PS input to the program store 429 via control signal 440 is deasserted. Likewise, when the CS_PS input to the program store 429 is asserted via control signal 440, the selector ensures that the CS_VS input to the interrupt vector store 406 is deasserted. In this manner, the interrupt vector store and the program store will not control the data bus simultaneously.

The separate R/W control signal 428 and CS_VS control signal 451 inputs to the interrupt vector store 406 are both necessary in this embodiment of the pre-stored vector interrupt handling system. The R/W control signal input to the interrupt vector store 406 ensures that the interrupt vector store 406 remains asserted write (W) throughout the initialization mode, and read (R) throughout the interrupt mode. The separate CS_VS input to the interrupt vector store 406 ensures that the interrupt vector store 406 maintains exclusive control of the data bus 408 in both the interrupt mode and the initialization mode.

In interrupt mode, in the absence of any interrupt, the processor 409 reads out and executes instructions from the program store 429. During this time, the processor's cycle type output signal 435, which is connected to the selector 470, is kept in a state indicating that the processor 409 is operating in a non-interrupt situation. When no interrupts are present, the selector 470 keeps the chip select signal 440 to the program store 429 asserted, and the interrupt request chip select signal 451 to the interrupt vector store 406 de-asserted.

The prioritizer 403 from time to time will receive interrupt requests from I/O devices 401 via the plurality of interrupt request lines 402. When an interrupt occurs during the interrupt mode, the master interrupt request signal 436 is asserted from the prioritizer 403 to the processor 409, which, in response, finishes its current instruction and asserts the cycle type signal 435, and the R/W signal 444, both connected to the selector 470. The selector 470, as before (with the embodiment shown in FIG. 3), intercepts the processors instruction fetch cycle type signal, as well as the processor's R/W output signal and address, and causes an interrupt vector (branch instruction op-code and address) to be directly loaded into the processor 409, by de-selecting the program store 429 and selecting the interrupt vector store 406. The prioritizer 403, in addition to generating the master interrupt request signal 436, identifies the appropriate vector by generating an interrupt identifier signal 410 based upon the interrupt that occurred (or, if multiple interrupts, the highest priority interrupt). The interrupt identifier signal 410 is passed through the multiplexer 404 to the interrupt vector store 406, forcing the corresponding interrupt vector from the interrupt vector store 406 onto the data bus 408. More specifically, the selector 470 selects the interrupt vector store 406, making its contents available on the data bus 408. When the processor 409 asserts the cycle type signal 435, it expects an interrupt vector (branch instruction op-code and address) to follow, and the interrupt vector from the data bus 408 is therefore loaded directly into the execution unit 452 of the processor 409.

A feature with both the systems in FIGS. 3 and 4 is that the interrupt identifier signal essentially provides a multi-bit encoded identification of the interrupt source and, hence, of the interrupt vector. The interrupt identifier signal can, in various embodiments, be applied directly to the interrupt vector store 308 or 406 as the address at which the corresponding interrupt vector is to be found. This direct correspondence between interrupt identifier and location of interrupt vector in the interrupt vector store provides advantages of speed and efficiency when responding to interrupts.

As with the system 300 described with respect to FIG. 3, the system 400 of FIG. 4 may include circuitry for masking various interrupt sources. For example, interrupt mask registers can be used to hold individual mask bits each indicating whether or not a specific interrupt may pass through. Each mask bit may control a gate (e.g., an AND gate or NAND gate) which allows the corresponding interrupt signal to pass through depending upon the state of the mask bit. Masking may be nested or unnested. If nested, higher-tier mask bits may each control a designated group of lower-tier mask bits. Interrupts only pass through if both the lower-tier mask bit specific to the interrupt and the higher-tier mask bit for the interrupt's designated group are both set appropriately.

Figure 5:
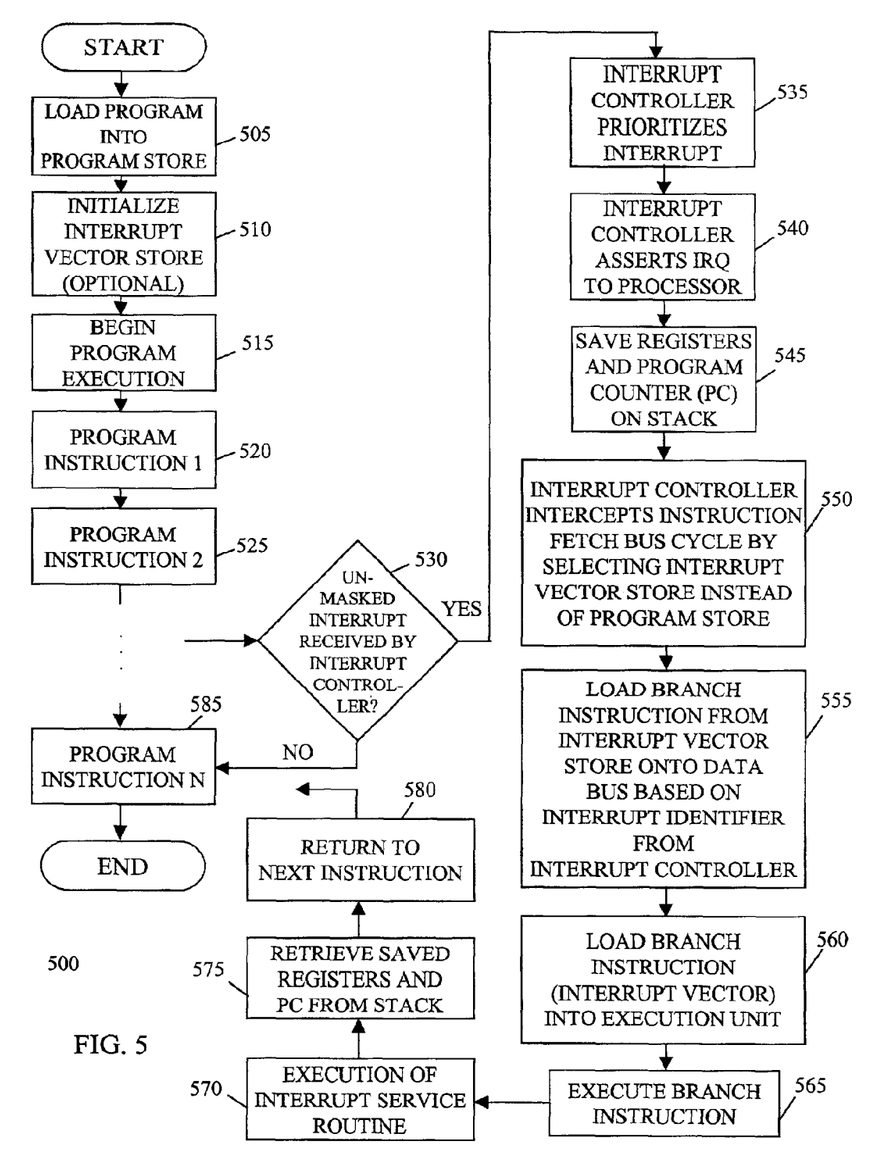
FIG. 5 is a flow diagram illustrating steps of a method for processing interrupts according to one embodiment as disclosed herein.

FIG. 5 depicts a flow diagram of the steps followed by a processor-based system incorporating a pre-stored vector interrupt handling system, such as, for example, the system in FIG. 3 or FIG. 4. In a first step 505, program code for the application is loaded into a program store (memory). In a next step 510, the pre-stored vector interrupt handling system is initialized using, as one example, the initialization technique described in the example embodiment description of FIG. 4. Step 510 is an optional step if the interrupt vector store is implemented in ROM. In step 515, program execution begins. Program execution is portrayed in FIG. 5 by the series of program instruction blocks labeled "Program instruction 1", 520 "Program instruction 2", 525 through "Program instruction N", 585. During normal program execution, the processor's instruction cycle is interrupted when the pre-stored vector interrupt handling system receives an unmasked service request from the interrupt controller 530.

In step 535 the interrupt controller prioritizes the interrupt before asserting an interrupt request signal (IRQ) to the processor 540. Processing the interrupt first may require a stack dump of the registers and the program counter to a stack. The interrupt controller intercepts the processor's instruction fetch bus cycle operation in step 550 by selecting the interrupt vector store and deselecting the program store. In step 555, the branch instruction op-code and address (interrupt vector) corresponding to the interrupt controller's identifier signal, travels directly to the processor's execution unit 560. After the execution of the interrupt vector 565, the next instruction executed by the processor will be the first instruction of the requested interrupt service routine 570. At the completion of the interrupt service routine in step 570, the saved contents of the PC and registers are retrieved from the stack and program execution resumes at the point where the processor instruction cycle was interrupted 580.

In each embodiment of the claimed invention, the interrupt sources can be either data storage devices, such as hard disk drives; data output devices, such as video display monitors; embedded hardware devices, such as timers; or data input devices, such as a keypad or a pointing device. Each of these categories of I/O devices is capable of benefiting from the advantages derived by the pre-stored vector interrupt handling system. The claimed invention and its embodiments act independently of the nature and number of interrupt sources.

While the embodiments of the pre-stored interrupt vector handling system described herein all use a cycle type (C_type) signal to qualify the processor's current bus cycle, the use of such a signal is not a pre-requisite of the invention. Cycle type signals are commonly found on processors and ease bus cycle decoding. One skilled in the art will realize that the address decoders and selectors shown in FIG. 3 and FIG. 4 may need modification for use with processors that do not produce cycle type signals. These modifications will be processor specific.

Moreover, a person skilled in the art will know that a processor-based system is broad enough to include a computer system, a wireless communication device such as a cell phone, a microcontroller, a digital signal processing system, or any interrupt-driven system which includes a central processor. A processor according to the various embodiments described herein may, for example, be a general purpose processor, an application-specific processor, a digital signal processor (DSP), or any other type of processor that is used to process instructions.

Various embodiments as described herein are expected to be faster than conventional interrupt methods for the following reasons: First, the pre-stored vector interrupt handling system is faster than traditional methods of interrupt handling because the system is not delayed by time-consuming searches that the traditional methods used for locating an interrupt service routine in memory. Second, interrupt latency can be low because the pre-stored vector interrupt handling system is completely implemented in hardware, while the traditional methods of searching for the location of an interrupt service routine are generally software-based. Third, processor time is not wasted searching for the interrupt service routine because the pre-stored vector interrupt handling system delivers a vector (branch instruction op-code and address) from the interrupt vector store directly to the processor's execution unit. As a result, the very next instruction the processor executes will be the first instruction of the relevant interrupt service routine.

The pre-stored vector interrupt handling system offers additional advantages, including processor independence, scalability, and nesting. Because the pre-stored vector interrupt handling system operates independently of specific processor instruction sets, the system may be used with many different processors. Furthermore, the system is scalable to any number of interrupt request sources. In a pre-stored vector interrupt handling system design that incorporates a prioritizer, such as, for example, the system of FIG. 4, interrupt nesting is possible by suitably configuring the prioritizer.

While various embodiments have been described herein in which various components are described as being connected to one another, it should be noted that the term "connected" is used in its broadest sense to mean connected directly or indirectly. For example, those skilled in the art will appreciate that various signals may be routed through multiplexers, buffers or other intermediate components, without changing the general overall functionality of the various systems, processes and apparatuses described herein. Therefore, the addition of other elements or components to the various implementations of the interrupt handling systems and processes described herein is intended to be fully encompassed within the scope of the invention.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. In a system comprising a processor configured to execute program code instructions stored in a program store, a pre-stored vector interrupt handling system, comprising:
   an interrupt vector store comprising a plurality of interrupt vectors;
   an interrupt control device connected to a plurality of interrupt request signals, said interrupt control device outputting an interrupt request signal to the processor; and
   a selector, responsive to the processor's cycle type signal, for selecting between a program code instruction from the program store and an interrupt vector from said interrupt vector store to be loaded directly into an execution unit of the processor.

2. The pre-stored vector interrupt handling system of claim 1, wherein the interrupt control device includes a prioritizer for prioritizing the plurality of interrupt request signals.

3. The pre-stored interrupt handling system of claim 2, wherein the prioritizer asserts an interrupt identifier signal to the interrupt vector store for identifying which interrupt vector to load into said execution unit.

4. The pre-stored vector interrupt handling system of claim 1, wherein the interrupt control device comprises a means for masking the plurality of interrupt request signals.

5. The pre-stored vector interrupt handling system of claim 4, wherein the masking means comprises a register for masking the plurality of interrupt request lines.

6. The pre-stored vector interrupt handling system of claim 1, wherein the interrupt vector store is pre-programmed with interrupt vectors, each of said interrupt vectors being a branch instruction that jumps to an interrupt service routine in the program store.

7. The pre-stored vector interrupt handling system of claim 1, wherein the interrupt vector store is implemented in read-only memory (ROM).

8. The pre-stored vector interrupt handling system of claim 1, wherein the interrupt sources include one or more of data input devices, data output devices, embedded hardware devices, and data storage devices.

9. The pre-stored vector interrupt handling system of claim 1, wherein the pre-stored vector interrupt handling system is incorporated in a computer system.

10. The pre-stored vector interrupt handling system of claim 1, wherein the pre-stored vector interrupt handling system is incorporated in a microcontroller.

11. The pre-stored vector interrupt handling system of claim 1, wherein the processor is a microprocessor.

12. The pre-stored vector interrupt handling system of claim 11, wherein the microprocessor includes a cache.

13. The pre-stored vector interrupt handling system of claim 12, wherein the microprocessor includes a means for pre-fetch instructions.

14. The pre-stored vector interrupt handling system of claim 1, wherein the pre-stored vector interrupt handling system is included in a wireless communication device.

15. The pre-stored vector interrupt handling system of claim 1 further comprising a multiplexer for selecting between an initialization mode and an interrupt mode.

16. The pre-stored vector interrupt handling system of claim 1, wherein the selector is connected to a cycle type output signal from the processor.

17. The pre-stored vector interrupt handling system of claim 16 wherein the selector asserts a chip select control signal to the interrupt vector store and deasserts a chip select control signal to the program store if the cycle type output signal from the processor is an interrupt cycle, and de-asserts said control signal to the interrupt vector store and asserts said chip select signal to the program store if the cycle type output signal from the processor is a non-interrupt instruction cycle.

18. The pre-stored vector interrupt handling system of claim 17, wherein the selector is connected to a read/write output signal from the processor, which read/write output signal is used by the selector to place the interrupt vector store into a read mode if the cycle type output signal from the processor is an interrupt cycle.

19. The pre-stored vector interrupt handling system of claim 1, wherein the processor is a digital signal processor (DSP).

20. In a system comprising a processor, a method for pre-stored vector interrupt handling, comprising the steps of:
   intercepting a processor's normal instruction fetch bus cycle;
   generating an interrupt identifier signal to the interrupt vector store; and
   delivering a pre-stored interrupt vector directly to the execution unit of the processor, said pre-stored interrupt vector dependent upon said interrupt identifier signal.

21. The method of claim 20 further comprising the step of initializing the interrupt vector store.

22. The method of claim 21, wherein the step of initializing the vector store further comprises the step of pre-storing the interrupt vector store with a plurality of interrupt vectors.

23. The method of claim 20, wherein the step of intercepting the processor's normal instruction fetch bus cycle further comprises the step of ensuring that the interrupt vector store has exclusive control of the data bus by asserting a chip select control signal to the interrupt vector store and deasserting a chip select control signal to the program store.

24. A system for handling interrupts in a processor-controlled device, said processor-controlled device comprising a processor executing a software program stored as a set of program instructions, the system comprising:
   an interrupt vector store;
   an interrupt controller connected to a plurality of interrupt request signals, said interrupt controller outputting a master interrupt signal; and
   a selector in a controlling arrangement with said interrupt vector store and with a memory storing program instructions being executed by the processor, said selector causing an execution unit of the processor to receive the next program instruction when the master interrupt signal is not asserted, and to receive an interrupt vector directly from the interrupt vector store when the master interrupt signal is asserted, the interrupt vector comprising a branch instruction op-code and address.

25. The system of claim 24, wherein said interrupt vector is provided directly to an execution unit of the processor.

26. The system of claim 24, wherein said interrupt vector store is dynamically loaded with one or more interrupt vectors when the processor is running.

27. The system of claim 24, wherein said interrupt vector store is statically pre-loaded with one or more interrupt vectors.

28. The system of claim 24, wherein said processor is connected to a system bus, and wherein said selector causes the processor to receive the next program instruction by asserting a first select signal connected to said memory storing said program instructions when the master interrupt signal is not asserted, and causes the processor to receive said interrupt vector from the interrupt vector store by asserting a second select signal connected to said interrupt vector store when the master interrupt signal is asserted.

29. The system of claim 24, wherein said interrupt vector store comprises a plurality of interrupt vectors, each interrupt vector corresponding to a different interrupt request signal.

30. A method for handling interrupts in a processor-controlled device, said processor-controlled device comprising a processor executing a software program Stored as a set of program instructions, the method comprising:
   storing interrupt vectors in an interrupt vector store;
   connecting an interrupt controller to a plurality of interrupt request signals;
   outputting a master interrupt signal from the interrupt controller;
   causing the processor to receive the next program instruction when the master interrupt signal is not asserted; and
   causing an execution unit of the processor to receive an interrupt vector directly from the interrupt vector store when the master interrupt signal is asserted, the interrupt vector comprising a branch instruction op-code and address.

31. The method of claim 30, further comprising providing the interrupt vector directly to an execution unit of the processor.

32. The method of claim 30, further comprising dynamically loading said interrupt vector store with one or more interrupt vectors when the processor is running.

33. The method of claim 30, further comprising statically pre-loading said interrupt vector store with one or more interrupt vectors.

34. The method of claim 30, wherein said processor is connected to a system bus, and wherein a selector causes the processor to receive the next program instruction by asserting a first select signal connected to said memory storing said program instructions when the master interrupt signal is not asserted, and causes the processor to receive said interrupt vector from the interrupt vector store by asserting a second select signal connected to said interrupt vector store when the master interrupt signal is asserted.

35. The method of claim 30, wherein said interrupt vector store comprises a plurality of interrupt vectors, each interrupt vector corresponding to a different interrupt request signal.

\* \* \* \* \*